United States Patent [19]

Gramer et al.

[11] 4,178,910

[45] Dec. 18, 1979

[54] SOLAR COLLECTOR AND SYSTEM FOR MOUNTING A PLURALITY OF SOLAR COLLECTORS ON A SURFACE

[76] Inventors: Eben J. Gramer, 5441 E. Nassau Cir., Englewood, Colo. 80110; Melvin O. Johnson, 6488 Southwood Dr., Littleton, Colo. 80121

[21] Appl. No.: 814,030

[22] Filed: Jul. 8, 1977

Related U.S. Application Data

[63] Continuation-in-part of Ser. No. 700,040, Jun. 25, 1976, abandoned.

[51] Int. Cl.² .................. F24J 3/02; F16M 13/00; F16L 21/02; F16J 15/10
[52] U.S. Cl. .................. 126/442; 248/226.5; 285/343; 285/351; 277/207 A; 126/417
[58] Field of Search .................. 126/270, 271; 277/207 A; 285/343, 351; 248/226.5

[56] References Cited

U.S. PATENT DOCUMENTS

| | | | |
|---|---|---|---|
| 2,122,821 | 7/1938 | Mohr | 126/271 |
| 2,914,344 | 11/1959 | Anthes | 285/351 |
| 3,965,887 | 6/1976 | Gramer et al. | 126/271 |
| 3,980,071 | 9/1976 | Barber, Jr. | 126/271 |
| 3,987,783 | 10/1976 | Powell | 126/271 |
| 3,996,918 | 12/1976 | Quick | 126/270 |
| 3,999,536 | 12/1976 | Bauer et al. | 126/271 |
| 4,052,000 | 10/1977 | Honikman | 126/271 |
| 4,055,163 | 10/1977 | Costello et al. | 126/271 |
| 4,062,351 | 12/1977 | Hastwell | 126/271 |
| 4,066,121 | 1/1978 | Kleine et al. | 126/271 |
| 4,077,393 | 3/1978 | Mattson | 126/270 |

FOREIGN PATENT DOCUMENTS

| | | | |
|---|---|---|---|
| 2449753 | 4/1976 | Fed. Rep. of Germany | 277/207 A |
| 2651847 | 5/1977 | Fed. Rep. of Germany | 126/270 |

*Primary Examiner*—John J. Vrablik
*Attorney, Agent, or Firm*—Burton & Dorr

[57] ABSTRACT

The invention involves solar energy collecting units and a system for mounting such units on a support surface. Each unit has a solar radiation collecting panel through which a heat transferring fluid such as water can pass. Each panel can be connected to the panel of adjacent units so that the heat transferring fluid can pass among a series of units as it is being heated. A tapered fluid inlet manifold is provided at one end of the solar collecting panel with a similar tapered fluid outlet manifold at the opposite end. An inlet tube is in communication with the inlet manifold and an outlet tube is in communication with the outlet manifold. Male-female couplings are provided about the respective inlet and outlet tubes so that adjacent solar collecting units can be easily and quickly connected. The tapered manifolds allow the fluid to drain quickly and completely out of whichever end of the collector panel is lower when the panel is not in use. A unique system for coupling the inlet and outlet tubes is provided to allow for expansion and contraction of the units during radical temperature fluctuations. Each solar collecting unit is mounted by flange members extending along the sides of the unit and separate longitudinal clamps to mounting rails aligned in parallel relationship on the supporting surface. The unique mounting system of the invention secures a plurality of the units onto the supporting surface to form an efficient solar energy collecting system. Each unit weighs about the same as standard roofing and the assembly of the units will completely cover and protect the supporting surface.

12 Claims, 16 Drawing Figures

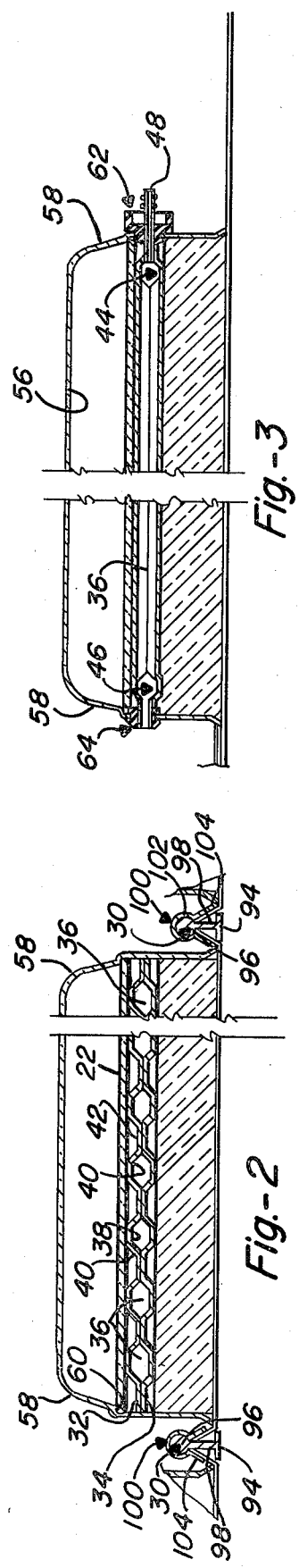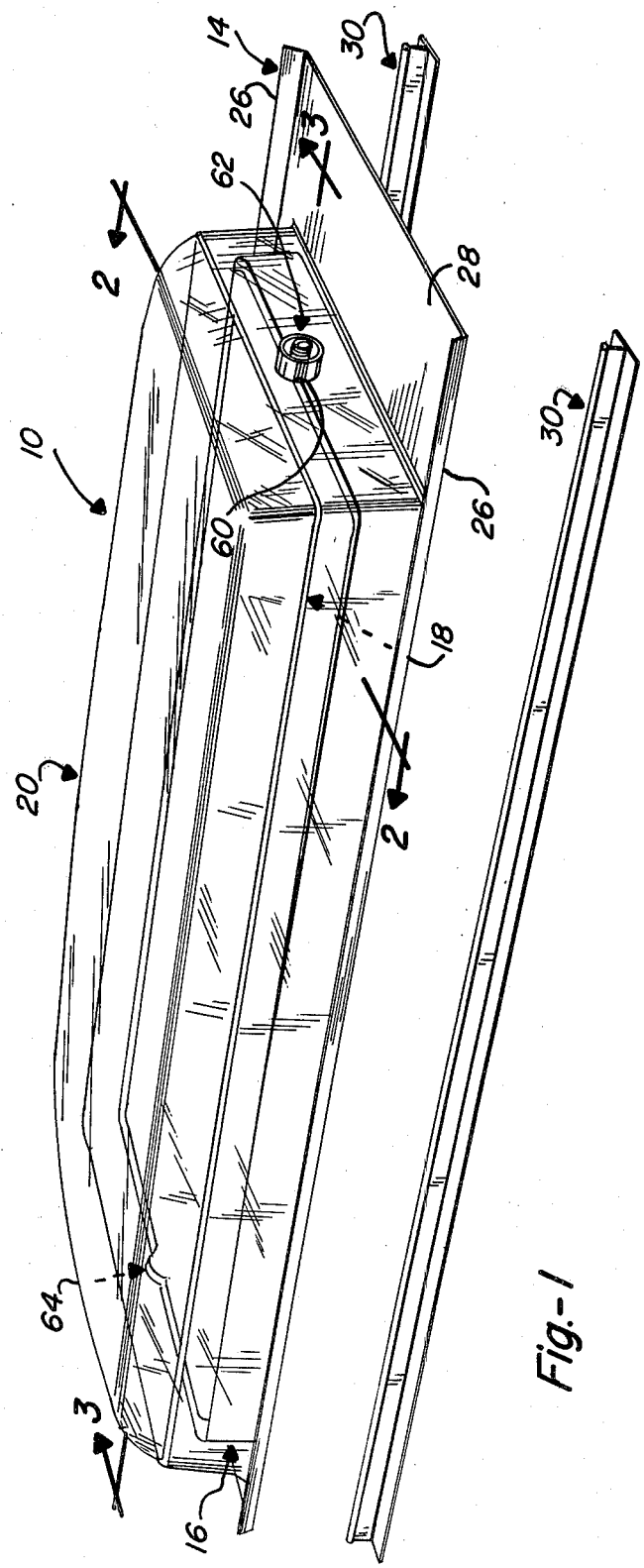

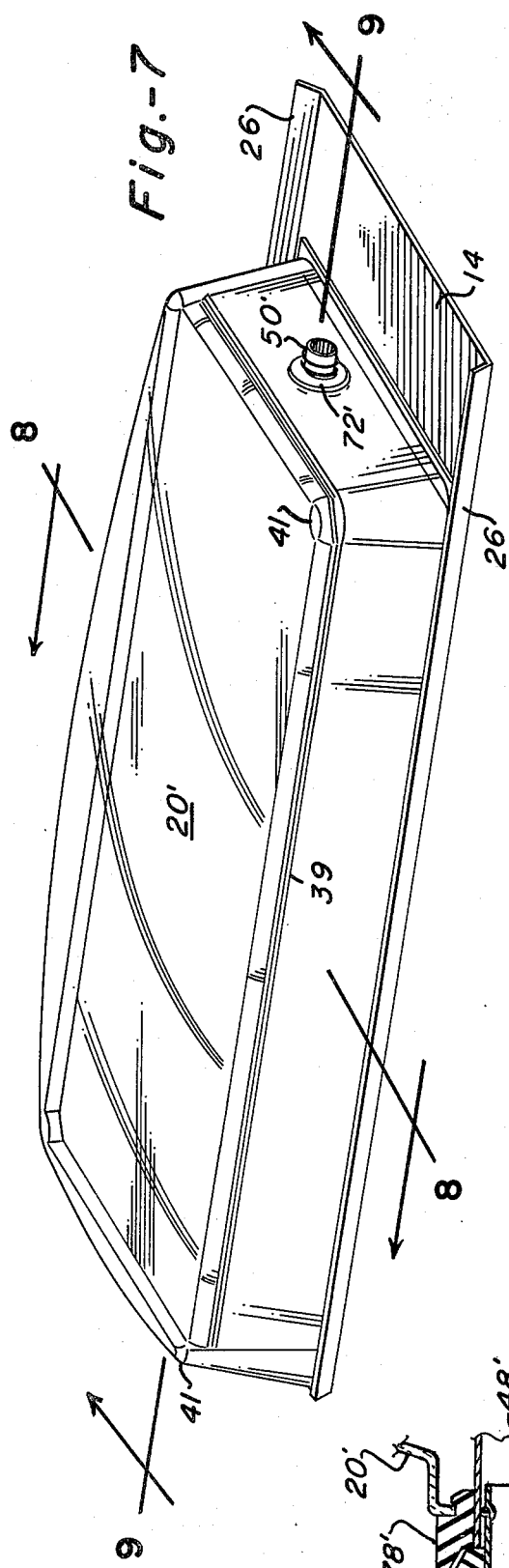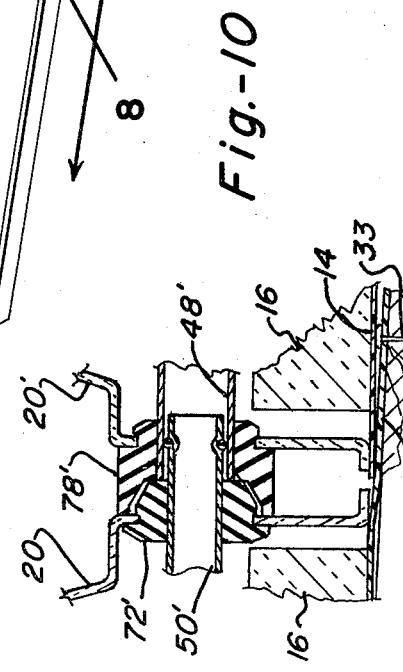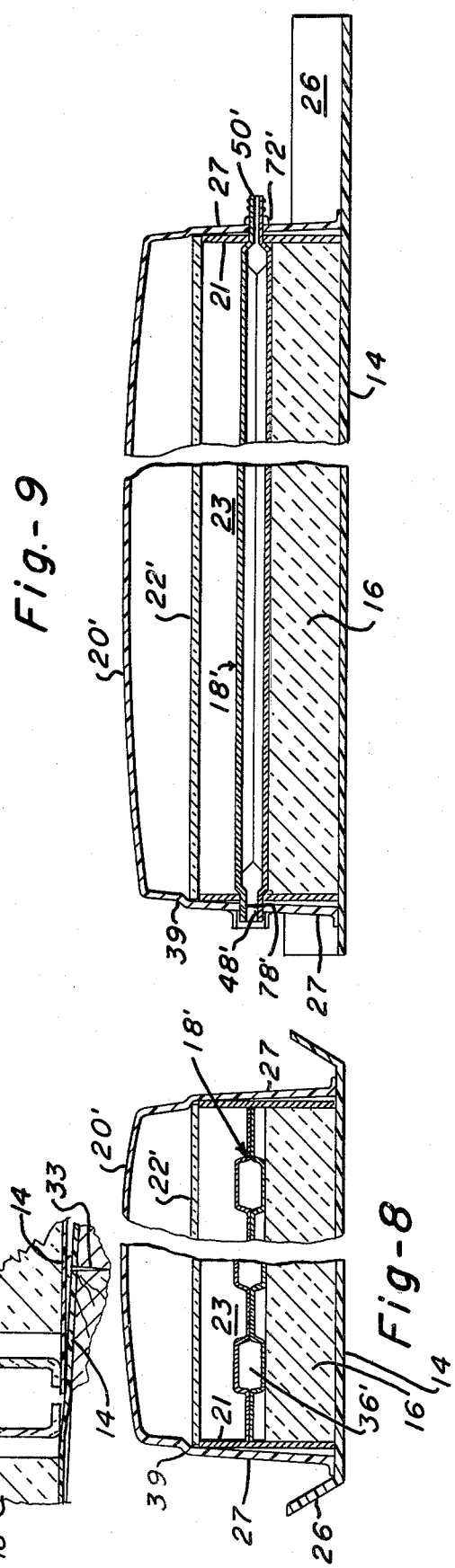

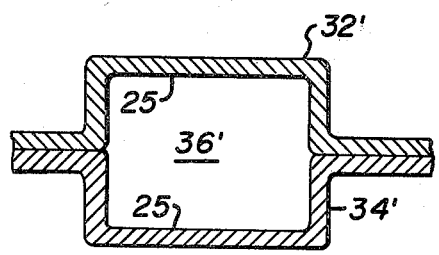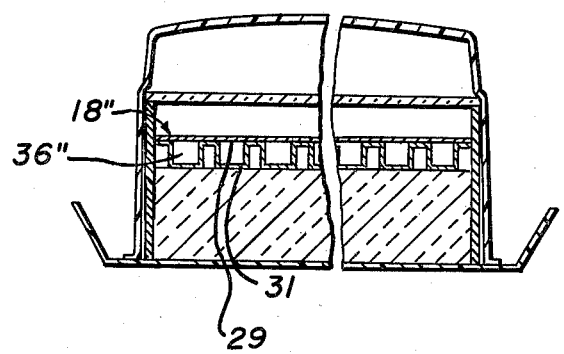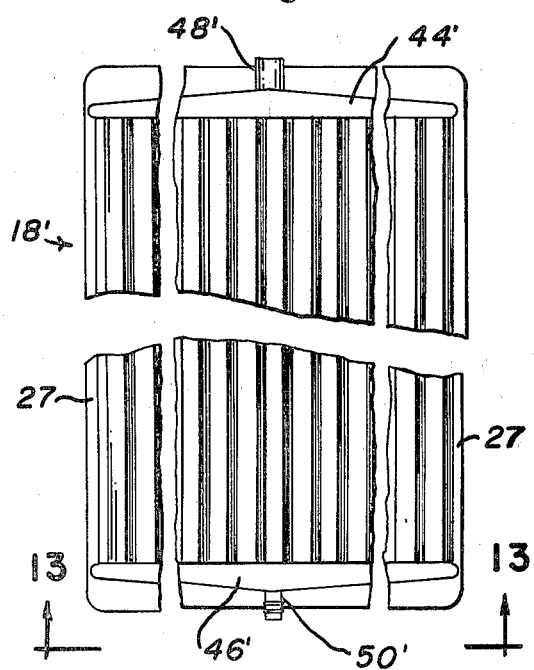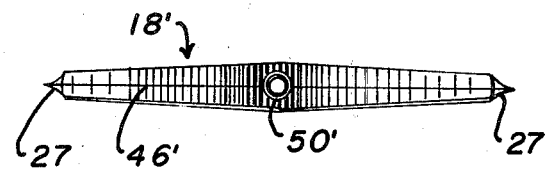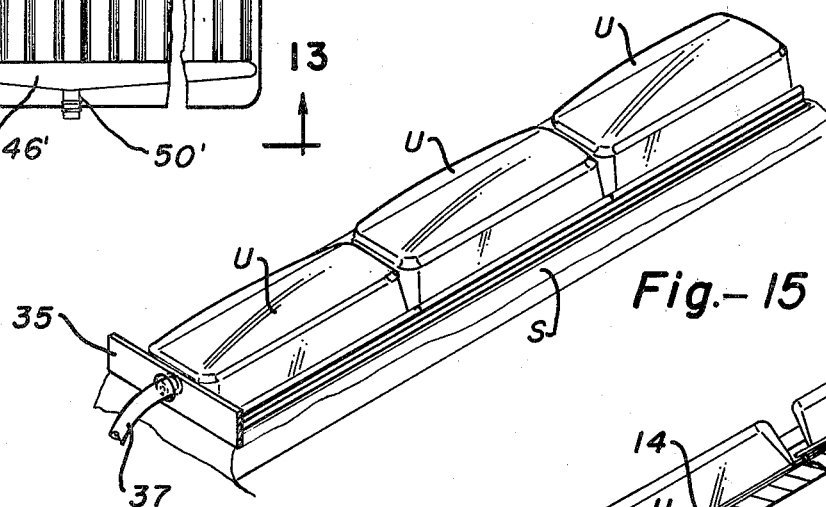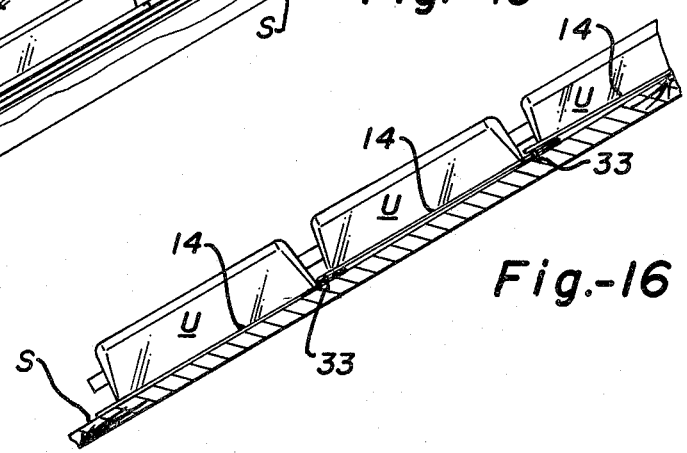

4,178,910

SOLAR COLLECTOR AND SYSTEM FOR MOUNTING A PLURALITY OF SOLAR COLLECTORS ON A SURFACE

RELATED APPLICATIONS

The present application is a continuation-in-part of U.S. patent application Ser. No. 700,040 filed on June 25, 1976, now abandoned.

FIELD OF THE INVENTION

This invention relates to solar energy collecting units and systems for mounting a plurality of such units on a support surface.

BACKGROUND OF THE INVENTION AND PRIOR ART

Numerous types of solar collectors have been designed to not only optimize the capture of solar radiation but to do so in an efficient and reliable manner with units that are aesthetically attractive. Most solar collector units consist of a large collector plate across which a fluid transfer medium such as water or air is passed. The heat from the collector plate is transferred to the fluid and the heater fluid can either be used immediately or passed into a storage chamber remote from the collector unit. The heated fluid is stored in the chamber until it is needed to heat a building structure or the like. The collector plates are typically covered with large expanses of glass or other transparent material which will allow solar radiation to pass therethrough and be absorbed by the solar collector plate.

Numerous systems have been employed for optimizing the transfer of solar radiation to the heat transfer medium and these different systems have met with varying degrees of success. More recently, it has become desirable to design the solar collector units so that they can be interconnected to cooperate in capturing solar radiation and transferring the heat to a fluid which can be stored in a storage area for later use.

Solar energy collecting systems with a plurality of individual solar collecting units encounter problems with expansion and contraction of the individual units. Such units undergo radical temperature fluctuations when in use and between uses. Past units have particular problems in passing the fluid through the units in a manner which will optimize the heat transfer from the units to the fluid and minimize or eliminate fluid losses during the expansions and contractions of the unit. U.S. Pat. No. 3,961,619 to Estes et al. issued on June 8, 1976, illustrates an arrangement of solar units designed to accommodate lateral movement between the units. Estes' units are individually supported on a horizontal surface by angle members 44 and 46 and are joined by bellows 104 and 112 extending between the units. These bellows are difficult to work with and adjacent units cannot be easily and quickly connected together. It appears that Estes' bellows 104 must be welded at each end to a solar unit. A simplistic male-female coupling is illustrated in U.S. Pat. No. 3,996,911 issued to Quick on Dec. 14, 1976; however, Quick's rectangular couplings are not designed to accommodate expansion and contraction as he states in lines 57-58 of his column 3 that the units abut each other so that the warmed air is not allowed to cool between units. More sophisticated couplings are illustrated in FIGS. 5-8 of U.S. Pat. No. 3,976,508 to Mlavsky issued on Aug. 24, 1976. The male-female couplings shown in Mlavsky's FIGS. 6-8 all have a portion of the male and female members soldered or otherwise bonded to each other so that the units can neither be quickly and easily assembled nor replaced if needed (see lines 8-11, 24-25, and 57-59 of his column 10).

Problems have also been encountered in designing a system including a plurality of solar collecting units such that the units can be mounted on a supporting surface in a quick and easy manner. This problem is especially acute if the supporting surface is a roof or other inclined surface. Two methods of mounting units side-by-side are illustrated by U.S. Pat. No. 3,174,915 to Edlin issued on Mar. 23, 1965 and U.S. Pat. No. 3,980,071 issued to Barber on Sept. 14, 1976. Each of these methods involves the use of an elaborate set of railings that are difficult and awkward to work with. The railings also appear to protrude upwardly from the support surface a distance such that they would block some sunlight when the sun is at low angles. The system of Barber would appear to require considerable time and labor at the construction site to install the railings.

Prior art solar collectors utilizing water as a heat transfer medium have been plagued with corrosion problems so that it has become desirable to utilize a non-corrosive material, such as stainless steel, in the manufacture of the collector plates. Certain characteristics of stainless steel, however, such as its ability to be deformed, have prevented others in the art from being able to use stainless steel. Another important feature of an efficient collector is the cross-sectional shape of its channels. Many collectors have channels with circular cross sections as illustrated by U.S. Pat. No. 3,999,536 to Bauer et al. issued on Dec. 28, 1976. Others have hexagonal cross sections such as U.S. Pat. No. 3,961,619 to Estes et al. issued on June 8, 1976. Still others have semi or half hexagonal cross sections like U.S. Pat. No. 3,399,664 to Suhay issued on Sept. 3, 1968 and semi-circular like U.S. Pat. No. 3,190,816 issued to Adamec on June 22, 1965. The channels of Suhay and Adamec each have an upper, flat side. Channels with circular cross sections tend to establish a rather large boundary layer that acts as an insulator and inhibits the flow of heat from the collector into the fluid. Channels having hexagonal cross sections with a larger surface area to volume ratio than circular are preferred. Hexagonal cross sections are also preferred over circular because they tend to set up less of a heat insulating boundary layer. In one embodiment, the present invention discloses channels with substantially rectangular cross sections. Although the theory is not fully understood, these rectangular channels have been found to have thinner boundary layers and higher threshhold rates for turbulent flow than other channel designs.

The ideal collector unit would be simple in design, able to safely use tap water, easily and completely drainable, attractive, durable, efficient and easily and quickly installable. The unit would also be lightweight and require little or no structural changes to the building on which is to be placed. Further, the unit would be able to be arranged with other units into a tight pattern on the support surface so that a very high percentage of the total light striking the support surface is received by the units. Each unit would also be completely assembled upon arrival at the building and would have an arrangement for easily and quickly replacing any unit in the pattern of units that has become damaged by accident or vandalism. The present invention offers such a collector unit and an arrangement for mounting a plurality of the units on a supporting surface to form an efficient system.

SUMMARY OF THE INVENTION

The solar collector of the present invention is of the type wherein a plurality of solar collecting units are interconnected on a supporting surface so as to be aesthetically appealing and to reliably accept the passage of a heat transferring fluid therethrough to absorb the heat from collected solar radiation and transfer that heat to a remote storage location.

In one embodiment, each solar collecting unit includes a stainless steel solar radiation absorbing or collecting panel having a plurality of elongated channels therethrough with the solar collecting panel being formed from two identical corrugated sheets which are joined in abutting face-to-face relationship to define the closed channels. The channels are adapted to accept the passage of a heat transferring fluid while the fluid is absorbing heat from the solar radiation collecting panel. By using two corrugated sheets in face-to-face relationship, it is possible to get the cross-sectional area necessary in each channel to conduct the needed volume of heat transferring fluid while staying within the deformation limits of stainless steel. The channels can have hexagonal or rectangular cross sections. In one embodiment, a grooved sheet and a flat sheet are placed together to form channels with rectangular cross sections.

The solar radiation collecting panels have inlets and outlets at opposite ends thereof adapted to be connected to an aligned outlet and inlet respectively of an adjacent unit so that the heat transferring fluid can be conducted from unit to unit while absorbing heat from each unit. The manifolds for these inlets and outlets are tapered so that the units can be quickly and completely drained when not in use. The fluid used in the units can be tap water and the tapered manifolds enable the water to drain away when the unit is not in use long before it can freeze.

The solar collecting units further include a base sheet separated from the solar radiation collecting panel by a layer of insulation and a cover member of a substantially transparent material adapted to admit solar radiation to the solar collecting panel and trap the radiation within the unit. The base sheet includes flanges along opposite side edges thereof and the flanges are held adjacent to parallel mounting rails on a supporting surface by clip members so that the solar collecting units are held in place regardless of temperature or other weather fluctuations. Each base sheet can be attached at one end to the support surface and successive base sheets overlapped in a shingle-type relationship that allows for movement between adjacent units while individually supporting each unit on the roof or other surface. In this manner, all of the weight of a row of units on an inclined surface is not concentrated on or supported by the lowest unit in the row as happens in prior arrangements.

A unique system is employed for connecting the inlet and outlet tubes of adjacent collecting units so that the expansion and contraction resulting from radical temperature fluctuation can be compensated for in a reliable manner while preventing the leakage of the heat transferring fluid from the system.

OBJECTS OF THE INVENTION

It is an object of this invention to provide a new and novel solar collector unit which is simple in design and can use tap water as the heat transferring fluid.

It is also an object of this invention to provide a new and novel solar collector unit that is preassembled at the factory and can be easily and quickly arranged with other units on a support surface such as a roof, wall, or similar surface.

Another object of the invention is to provide a new and novel solar collector unit with a high efficiency that can be arranged with other such units to form a highly efficient solar energy collecting system.

It is an object of this invention to provide a new and novel solar collector unit that is no heavier than normal roofing so that no structural changes need to be made to the building to support the unit.

Another object of the invention is to provide new and novel solar collector units that can be arranged in a pattern wherein each unit supports its own weight and yet can move relative to adjacent units to accommodate thermal expansion and contraction.

Another object of the invention is to provide new and novel solar collector units that can be arranged in a pattern wherein a damaged unit can be easily and quickly replaced.

It is an object of the invention to provide a new and novel solar collecting unit that can be quickly and completely drained of its fluid.

Another object of the invention is to provide a new and novel solar collector unit with thin stainless steel channels for quick heat absorbtion by the heat transferring fluid.

It is an object of this invention to provide a new and novel solar collector unit that is durable and attractive.

It is also an object to provide a new and novel solar energy collecting system in which the individual collector units have flexible base sheets which absorb the stresses and strains of any sway in the support surface instead of other parts of the unit which are less able to absorb such forces.

It is an object to provide a new and novel solar energy collecting system which completely covers and protects the support surface on which the system is mounted.

Additional objects as well as features and advantages of this invention will become evident from the descriptions set forth hereinafter when considered in conjunction with the accompanying drawings.

BRIEF DESCRIPTION OF THE DRAWINGS

FIG. 1 is a perspective view of a solar collecting unit according to the present invention in which the unit is elevated relative to the supporting surface.

FIG. 2 is a vertical section taken along line 2—2 of FIG. 1.

FIG. 3 is a vertical section taken along line 3—3 of FIG. 1.

FIG. 7 is a perspective view of a preferred collector unit.

FIG. 8 is a view along line 8—8 of FIG. 7 showing a sectional view and illustrating the rectangular cross section of the channels. For purposes of illustration, the relative size of the channels is greatly exaggerated in this view.

FIG. 9 is a view along line 9—9 of FIG. 7 showing a sectional view of the unit. The relative size of the channels is greatly exaggerated for purposes of illustration.

FIG. 10 is a detailed view of the coupling arrangement of the modified units of FIGS. 7-16.

FIG. 11 is a cross-sectional view of a channel in which two sheets are mounted in a face-to-face relationship to form a channel with a substantially rectangular cross section. The channel walls are very thin and meet at slightly rounded corners to avoid stress cracks.

FIG. 12 is a view of the panel through which the fluid flows illustrating the placement of the channels and the tapered inlet and outlet manifolds.

FIG. 13 is a view along line 13—13 of FIG. 12 illustrating how the manifolds taper down near the side edges of the panel.

FIG. 14 illustrates a modification of the panel in which a flat sheet is mounted against a second sheet which has a plurality of three-sided grooves. The two sheets form a panel whose channel has substantially rectangular cross sections. In this modification, the flat sheet is placed above the second sheet. The relative size of the channels is greatly exaggerated in this Figure for purposes of illustration.

FIG. 15 illustrates how a plurality of the solar collector units can be mounted on a roof in close proximity to each other.

FIG. 16 is a sectional view illustrating how the solar collector units of FIG. 15 are mounted in a shingle-type relationship with the upper end of each unit attached to the roof. This arrangement allows for relative movement between the solar collector units due to thermal expansion and contraction. In this arrangement, each solar collector unit is individually mounted to the roof and supports its own weight so that the weight of a row of units such as those shown in FIG. 14 is not all concentrated on the lowest unit.

DETAILED DESCRIPTION OF THE PREFERRED EMBODIMENTS

Figure 4:
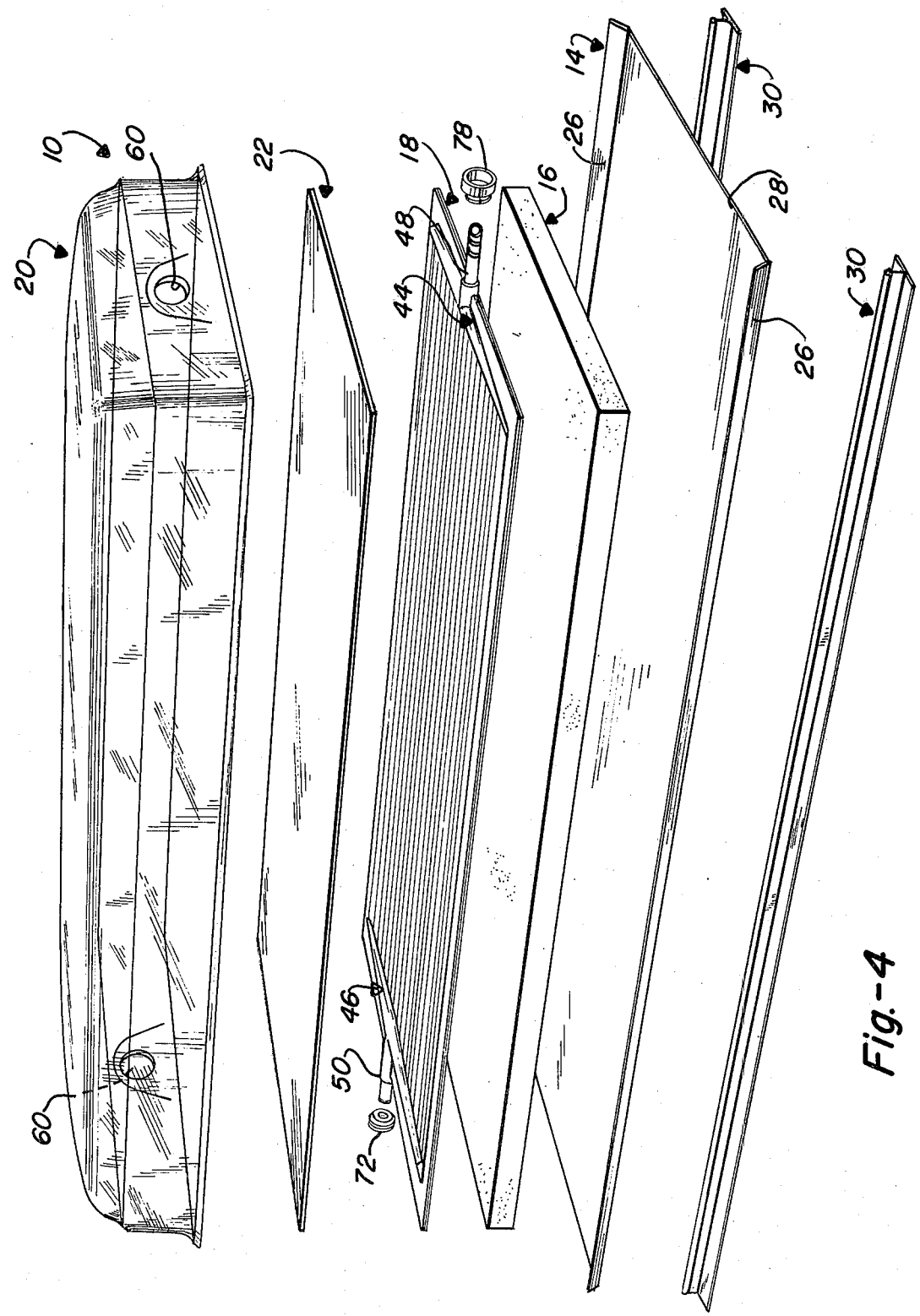
FIG. 4 is an exploded perspective view of the solar collecting unit shown in FIG. 1.

As best seen in FIG. 4, one solar collecting unit 10, according to the present invention, includes a base sheet 14, an integral layer of insulation 16 positionable on top of the base sheet 14, a solar radiation absorbing or collecting panel 18 positionable on top of the insulation 16, and a generally dome-shaped cover 20 having a plate of substantially transparent material 22 secured to it.

The base sheet 14 is preferably made of a semi-rigid plastic material such as ABS plastic and is of generally rectangular configuration having a pair of flange members 26 along opposite sides thereof pivotally connected by a living hinge to the bottom portion 28 of the base sheet. The flange members 26 are adapted to be held adjacent to a pair of mounting rails 30 for securing the unit to a supporting surface as best seen in FIG. 2.

The insulation layer 16 may be any suitable insulation material such as fiberglass matting or the like and is dimensioned so as to be seated upon the bottom portion of the base sheet 14.

The solar radiation collecting panel 18 of FIGS. 2-4 includes a pair of identical corrugated sheets 32 and 34 affixed in abutting face-to-face relationship so as to define channels 36 through which a heat transferring fluid, such as water or the like, can be passed to absorb heat from the panel 18. Referring to FIG. 2, the corrugations 32 and 34 in each sheet can be seen to define troughs or grooves having a bottom wall 38 and a pair of obliquely related side walls 40. Between each groove is a web 42 so that when the corrugated sheets are placed in abutting face-to-face relationship, the webs 42 are in abutted engagement while the grooves of opposing sheets are aligned to define a channel 36.

Figure 5:
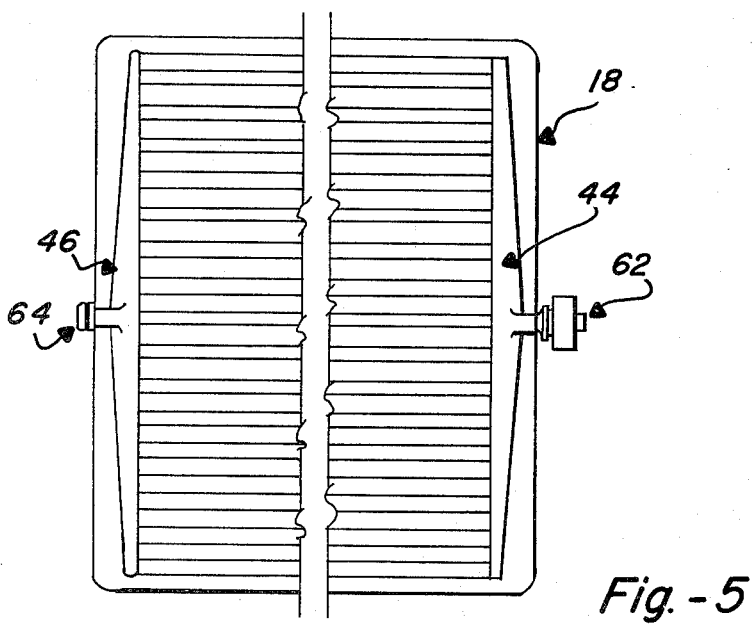
FIG. 5 is a top plan view of the solar collector unit shown in FIG. 1 with an intermediate portion removed for purposes of illustration.

At opposite ends of the solar collecting panel 18 is an inlet manifold 44 and an outlet manifold 46 which are of generally triangular configuration and in fluid communication with the channels 36. The inlet 44 and outlet manifolds 46 are similarly formed from grooves provided in each of the corrugated sheets so that when the sheets are placed in face-to-face relationship, the grooves define the manifold. The manifolds extend substantially perpendicular to the elongated parallel channels 36. As best seen in FIGS. 4 and 5, each manifold 44 and 46 tapers toward the respective tube 48 and 50. Each manifold 44 and 46 also tapers outwardly of the respective tubes 48 and 50 toward the side edges of the panel 18.

Figure 6:
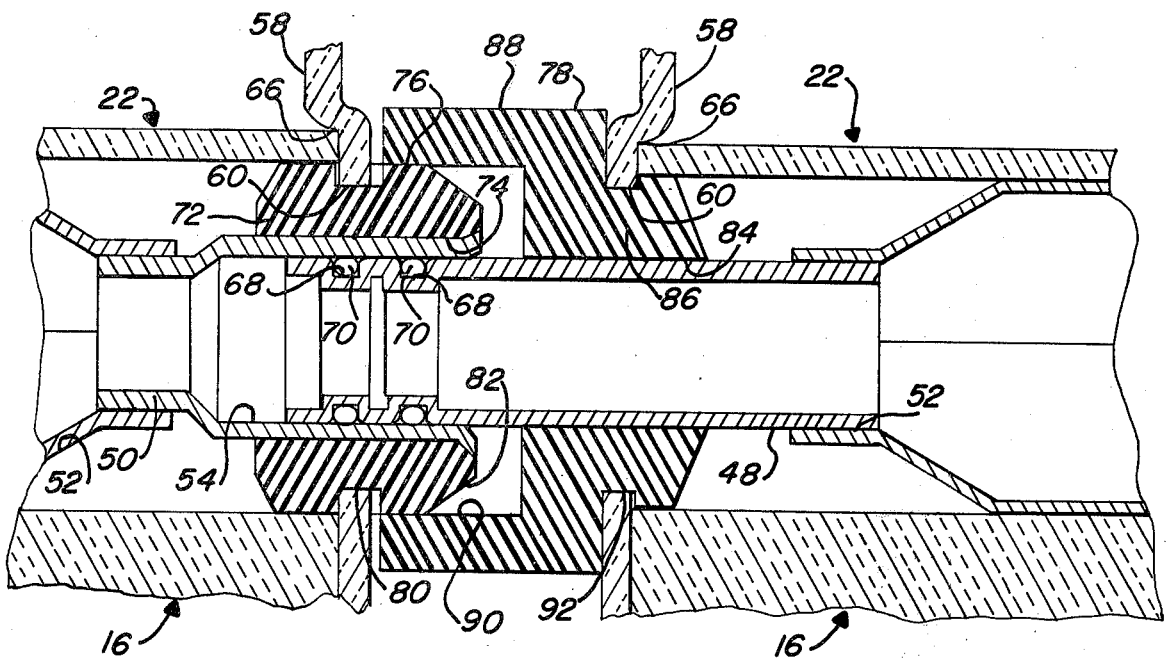
FIG. 6 is an enlarged section taken through the juncture of adjacent solar collecting units.

At the center of each manifold, a substantially circular opening 52 is provided in communication with the manifold and is adapted to receive a tubular member. The tubular member communicating with the inlet manifold 44 is an inlet tube and the tubular member communicating with the outlet manifold 46 is an outlet tube 50. The direction of fluid flow can be reversed if desired. The tubular members 48 and 50 are hermetically sealed in the openings 52 to prevent leakage of the heat transfer fluid. As best seen in FIG. 6, the outlet tube 50 includes a radially expanded segment 54 on its outermost end such that the internal diameter of the radially expanded portion is slightly greater than the external diameter of the inlet tube 48. With this arrangement, the inlet tube 54 of one solar collecting unit can be inserted into the outlet tube 48 of an adjacent solar collecting unit while compensating for slight misalignment.

The solar radiation collecting panel 18 is preferably made of a metallic material such as stainless steel. The side of the panel exposed to the incoming radiation is primed and coated with a black coating such as of the type marketed by the 3M Company of Minneapolis, Minnesota under the trademark Nextel 101-C10.

As is known to those in the art, stainless steel is not readily deformable as other metals currently used in solar collectors but does have the advantage of being corrosion resistant. It has been found that by making the panel 18 out of two corrugated sheets, the requisite cross-sectional area of the channels 36 can be obtained within the stretch limits of stainless steel. In the preferred embodiment, the cross-sectional area of the channels 36 would be approximately 0.025 square inches.

The cover 20 for the solar collector unit 10 is generally dome-shaped having a substantially flat upper surface 56 and four downturned side walls 58 which are continuous with the top surface and adapted to extend down to and be seated upon the base sheet 14. The width of the cover is such that it seats on the bottom portion 28 of the base sheet between the flange members 26. The cover 26 is provided with an opening 60 at each end adapted to receive the inlet and outlet tubes of the solar radiation collecting panel. Connector elements 62 and 64 are adapted to allow for expansion and contraction of adjacent units. The cover 20 could be made of several materials but in the preferred embodiment is made of a plexiglass material.

The cover dome 20 is provided with an internal peripheral shoulder 66 along which the plate of transparent material 22, which could be glass, plexiglass, or the like, can be seated and bonded to the dome. Consequently, there are two layers of substantially transparent material through which the solar radiation passes before impinging upon the solar radiation collecting panel 18. The two layers of transparent material are a common technique for preventing long wave radiation from escaping from the collector once the solar radiation, which is relatively short wave, has passed through the cover 20 and impinged upon the solar radiation collecting panel 18. The plate 22 is bonded to the cover dome 20 with a suitable bonding medium such as a silicone rubber which will not only seal the connection of the plate to the dome 20 but also remain bonded even during expansion and contraction of the dome due to extreme temperature fluctuations to which the cover 20 will be exposed.

The inlet tube 48 of one collector unit is adapted to be inserted into the outlet tube 50 of an adjacent unit to connect the solar radiation collecting panels so that a heat transferring fluid such as water, air, antifreeze solutions and the like can be passed from one collector unit into an adjacent collector unit. To seal the connection between the inlet tube 48 of one collector unit and the outlet tube 50 of an adjacent collector unit, the inlet tube 48 has a pair of circular grooves 68 in its outer surface. These grooves 68 serve to seat a pair of O-rings 70 which seal the connection of the inlet tube to the associated outlet tube. Further, this type of seal allows the tubular elements to be slid axially of each other as when the solar radiation collecting panels are expanding or contracting due to temperature fluctuations. This seal arrangement also permits easy and fast installation of the units in a pattern as well as easy and fast replacement if any damaged unit is in the pattern.

The outlet tube 50 has a male connector element 72 received thereon with the male connector element 72 having a circular passage 74 through its longitudinal center for receiving the outlet tube 50. An outer cylindrical wall 76 is adapted to be mated with a female connector element 78 mounted on the inlet tube 48. The male connector element 72 has a circular groove 80 in its outer wall which is adapted to receive the dome-shaped cover 20. In this regard, the male element is seated in one of the openings 60 provided in opposite ends of the cover 20. The outer wall 76 on the male connector element 72 extends outwardly from the groove 80 approximately ⅛ inch and then tapers inwardly toward the outer end of the male element forming a frusto-conical surface 82. The male connector element 72 is preferably made of an artificial rubber material, such as silicone rubber, which will withstand temperatures at least as high as 177° C.

The female connector element 78 is positioned on the inlet tube 48 and as is best seen in FIG. 6, has a circular passage 84 therethrough adapted to receive the inlet tube 48 of a solar radiation collecting panel 18. The passage 84 in the female member is through a relatively thick body portion 86 and a circular flange 88 projects outwardly from the body portion to define a circular recess 90 into which the male connector element 72 can be slidably received. The depth of the recess 90 defined by the circular flange 88 is sufficient to allow approximately a ⅛ to ¼ inch sliding movement of the male connector element 78. This has been found to be adequate to compensate for the expansion and contraction of adjacent solar radiation connecting panels during most temperature fluctuations experienced at most locations around the world. The female connector element 78 also has a groove 92 provided in the outer surface of the main body portion thereof which is adapted to receive the dome-shaped cover 20 at the opposite end from the male connector element. The female element 78 is inserted into the opening 60 provided in the cover 20 at the opposite end from the opening receiving the male element and is retained therein by the cover projecting into the groove 92.

The female connector element 78 is preferably made of a rubber material or artificial rubber material like the male connector element 72 so that there can be a seal between the connector element about which it is mounted and a seal between the male 72 and female 78 connector elements themselves. By utilizing the male and female connector elements along with the sealing O-rings 70 between the engaging surfaces of the tubes 48 and 50, the joint between adjacent solar collecting units is completely sealed and leak-proof. Consequently, even during expansion and contraction of adjacent units, the fluid can be passed between adjacent units without loss.

The solar heat collecting units 10 are mounted upon a supporting surface, such as the roof of a building structure, between mounting rails 30 which extend in parallel relationship. As best seen in FIGS. 1, 2, and 4, the mounting rails 30 are elongated and have a base element 94 connected to an upper bead portion 96 by a web 98 extending perpendicularly to the base element 94. The mounting rails 30 are secured to the supporting surface in any suitable manner at a spacing slightly greater than the width of the bottom portion of the base panels 14 of the collecting units so that the flange members 26 along opposite sides of the base panels 14 will extend upwardly to meet the mounting rail 30 at the bottom of the bead portion 96 thereof. To retain the collecting units adjacent to the mounting rails, an elongated clip or clamp member 100 is snapped over the bead portion 96 so as to extend along the length of the rail. One long clip member 100 or a series of clip members 100 can be mounted on each rail 30. The clip member 100, as best seen in FIG. 2, has a head portion 102 which is substantially circular in cross-section so as to fit over the head 96 of a mounting rail 30. A pair of downwardly and outwardly projecting leg portions 104 which are connected to the head are adapted to overlie the flanges 26 of adjacent collecting units so that the collecting units cannot be lifted while a clip member 100 is positioned on a mounting rail 30 in overlying relationship with the flanges 26 on adjacent collecting units. In one embodiment, the clip members are slightly longer than the flanges of a particular unit so that longitudinally adjacent clip members will overlap. The clip members cooperate with the base sheets to cover and protect the supporting surface for the system from rain and other adverse weather conditions. Also the base sheets of adjacent, longitudinally aligned units are overlapped for the same purpose.

The dome cover 20 is bonded to the base sheet 14 to maintain the insulation 16 and the solar radiation collecting panel 18 in a fixed position on the base sheet 14.

When the solar collecting units are interconnected, the heat transferring fluid can be passed from the inlet tubular element 48 of one unit into the inlet manifold 44 through the channels 36 to the outlet manifold 46 and out the outlet tubular element 50. From there, it can be passed into the inlet tubular element 48 of an adjacent collecting unit and the flow sequence repeated. Preferably, the fluid is pumped from the lower end of the unit upwardly through aligned units until it reaches the uppermost unit and from that location directed through an insulated passage to a storage tank or area which may be in the basement of the building structure.

The heat can be stored in the storage tank or area until needed to heat the building structure. If desired, systems can be employed for conducting the heat transferring fluid directly from the solar collector through the building structure and bypassing the storage tank.

The flange members 26 abut a lower portion of the bead members on the mounting rails 30 when the solar collector units are assembled on the support surface as best seen in FIG. 2. The maximum distance between the flange members 26 of each unit is slightly greater than the minimum distance between adjacent bead members. Since the flange members 26 are flexible, they will be flexed inwardly away from their preferred position when the unit is initially moved between adjacent mounting rails 30. Once past the bead members, the flange members 26 will move back toward preferred positions and will abut a lower portion of the bead members.

In the modified solar collecting unit of FIGS. 7-12, the plate 22' of substantially transparent material such as glass is not bonded to the dome-shaped cover 20' and rests on the top edges of the support member 21. The plate 22' is spaced from the collecting panel 18' to create an air gap 23 therebetween. This manner of supporting plate 22' allows for the different rates of thermal expansion and contraction should cover 20', plate 22', and support member 21 be made of different materials as for example plexiglass, glass, and cardboard respectively. The temperature within the air gap 23 can be typically 350° F. when the fluid is not circulating within the unit. This temperature is preferably within the range of 90° to 180° F. when the fluid is circulating. The support member 21 also serves as a heat shield for the sides 27 of the cover 20'. The walls 27 of the cover 20' have an inwardly directed shoulder portion 39 where they meet the dome portion of the cover 20' as best seen in FIGS. 7-9. The shoulder portion 39 extends between adjacent corners 41 of the cover 20' as illustrated in FIG. 7. The perimeter portion of the plate 22' rests on the top edges of the support member 21 and is supported between the upper part of the shoulder portion 39 and the top edges of support member 21 as best seen in FIGS. 8 and 9.

In practice, the distance between the upper part of the shoulder portion 39 and the top edges of support member 21 is slightly greater than the thickness of the plate 22' to allow for some relative movement in a vertical direction. Further, the peripheral edge of the plate 22' is also slightly less than the adjacent peripheral dimension of the shoulder portion 39 to allow for some relative movement in a horizontal direction due to thermal expansions and contractions.

The cross-sectional shape of the channels 36' in the collecting plate 18' are substantially rectangular as best seen in FIGS. 8 and 11. The relative size of the channels 36' is greatly exaggerated in FIGS. 8 and 9 for purposes of illustration. The sheets 32' and 34' are preferably made of stainless steel with a wall thickness on the order of 0.018 inches. Like panel 18, the outer surface of the walls have a black coating. The walls of the channel 36' are fabricated to meet at slightly rounded corners to avoid stress cracks which invite corrosion and ultimate failure of the panel 18'. The distance between opposing wall surfaces 25 in FIG. 11 is preferably on the order of 0.050 inches. The thin walls allow the fluid to absorb the heat energy from the collecting plate 18' quickly. The preferred cross-sectional dimensions of the channel 36' and consequent ratio of channel surface area to fluid volume has been found to be particularly efficient in transferring the heat energy to the fluid. Although not fully understood, the substantially rectangular cross-sectional shape of the channel 36' is believed to have a smaller boundary layer than other designs and a higher threshhold rate for turbulent flow. In practice, the rectangular channels 36' have been found to maintain laminer flow at higher flow rates than other designs.

The male-female coupling arrangement of the modified units of FIGS. 7-16 is essentially the same as that of FIG. 6 with a few of the roles reversed. The inlet tube 48' and outlet tube 50' of the modified units are reversed from the arrangement of FIG. 6 as are the male connecter element 72' and female connector element 78' as best seen in FIG. 10. The male connector element 72' is positioned about the outlet tube 50' and the female connector element 78' is positioned about the inlet tube 48'. The coupling arrangement of FIGS. 6 and 10 is equally applicable to any of the collector units disclosed and each arrangement continuously provides a slidable, fluid tight seal between adjacent units. The plug-in manner of assembling the coupling arrangement significantly reduces the cost and time needed to arrange the units into a solar energy collecting system on a support surface.

FIGS. 12 and 13 show views of the collector panel 18' and illustrate the tapering shape of the inlet and outlet manifolds 44' and 46'. Each manifold 44' and 46' tapers toward the respective tubes 48' and 50' as seen in FIG. 12. They also taper toward the side edges 27 of the panel 18' as illustrated in FIG. 13.

FIG. 14 illustrates a third modification in which the panel 18" has a flat sheet 29 that is mounted against a second sheet 31 which has a plurality of three-sided grooves. The two sheets 29 and 31 are preferably made of stainless steel and form a panel 18" whose channels 36" have substantially rectangular cross sections. In this modification, the flat sheet 29 is placed above the sheet 31 and the side of sheet 29 exposed to the sun is painted black. As in FIGS. 8 and 9, the relative size of channels 36" is greatly exaggerated in FIG. 14 for purposes of illustration.

As best seen in FIGS. 15 and 16, a plurality of the solar collector units U of the invention can be arranged in a tight pattern on a support surface such as the roof of a building. In this arrangement, the inlet and outlet tubes of each unit are axially aligned and the units are in rows in which the axes of alignment of each unit in a row are colinear and in the same vertical plane. If desired, the units U can be individually mounted to the supporting surface S by nails, screws, or other attaching means 33 as illustrated in FIGS. 10 and 16 so that each unit supports its own weight and the entire weight of a row of units is not concentrated on the lowest unit. Preferably, only one end of each unit is attached to the supporting surface S so that adjacent units are still free to move relative to each other to accommodate thermal expansion and contraction. In practice, support member 35 can be attached to the roof to act as an initial base from which to install the units as well as a supporting element for the hose 37 through which the fluid is pumped into the units U on the roof. Each solar collecting unit weighs approximately the same as roofing material (on the order of four pounds per square foot) so that the structure of the building need not be modified or reinforced to support the units of the present invention. The total weight of each unit is about thirty-two pounds so that they can be easily carried and manipulated by one person. The base sheet 14 is flexible so that it absorbs the stresses and strains produced during thermal expansion and contraction as well as when the building sways instead of the other elements of the unit which are less able to withstand such forces. Further, the overlapping of the base sheet 14 of adjacent units as well as the arrangement of flanges 26, mounting rails 30, and abutting or overlapping clip members 100 produce a solar energy collecting system which completely covers and protects the supporting surface S. The ratio of the absorption area to the roof area of the system is on the order of 85% to 90% and the overall efficiency of the system is very high.

The mounting system of this invention including flexible base sheets 14 as illustrated in FIGS. 1-16 is equally applicable to other solar collecting unit designs. Other collector designs could be mounted to base sheets like 14 and arranged on mounting rails 30 in accordance with this invention to create a solar energy collecting system. Although other collector units could be adapted to the mounting system of the present invention, the collector units disclosed herein are preferred because of their very high efficiency and ease of installation.

While several embodiments of the present invention have been described in detail herein, various changes and modifications can be made without departing from the scope of the invention.

We claim:

1. A solar energy collecting system adapted to be mounted on a supporting surface comprising:
    a plurality of individual solar collector units, each of said units having a base sheet member having flange members extending along opposite sides thereof, wherein each of said base sheet members has a substantially planar main portion from which said flange members extend upwardly at an angle,
    mounting rails extending in parallel relationship along said supporting surface between adjacent units, each of said mounting rails includes a bead member having a symmetrical cross-sectional width greater than the portion of the rail immediately below said bead member extending along an upper edge thereof, and
    clip means for maintaining the upwardly extending flanges of said units against said mounting rails, said clip means extending over at least a portion of said mounting rails and a portion of said flange units to integrate the units into a solar energy collecting system, said clip means being sufficiently resilient to snap onto said bead members, said flange members abutting a lower portion of the bead members of the respective mounting rails when said solar energy system is assembled.

2. A solar energy collecting system adapted to be mounted on a supporting surface comprising:
    a plurality of individual solar collector units, each unit having a solar energy absorbing means and at least one substantially transparent means covering said absorbing means for preventing captured heat from escaping from the unit, said units including a base sheet member having flange members extending along opposite sides, each of said base sheet members having a substantially planar main portion from which said flange members extends upwardly at an angle,
    mounting rails extending in parallel relationship along said supporting surface between adjacent units,
    clip means for maintaining said units against said mounting rails, said clip means extending over at least a portion of said mounting rails and a portion of said flange members to integrate the units into a solar energy collecting system,
    each of said mounting rails includes a bead member extending along an upper edge thereof wherein said clip means are sufficiently resilient to snap onto said bead members, said flange members abutting a lower portion of the bead members of the respective mounting rails when said solar energy system is assembled and with the maximum distance between said flange members of each unit being slightly greater than the minimum distance between the bead members of parallel mounting rails, said flange members being flexible whereby said flange members of each unit are flexed inwardly away from a preferred position when said unit is initially moved between said parallel mounting rails and moves back to said preferred position once said flange members pass by the respective bead members on the parallel mounting rails with the flange members abutting said lower portion of the bead members.

3. A solar energy collecting system adapted to be mounted on a supporting surface comprising:
    a plurality of individual solar collector units, each of said units having a base sheet member having flange members extending along opposite sides thereof, wherein each of said base sheet members has a substantially planar main portion from which said flange members extend upwardly at an angle,
    mounting rails extending in parallel relationship along said supporting surface between adjacent units,
    clip means for maintaining said units against said mounting rails, said clip means extending over at least a portion of said mounting rails and a portion of said flange members to integrate the units into a solar energy collecting system,
    each of said mounting rails includes a bead member extending along an upper edge thereof and wherein said clip means are sufficiently resilient and adapted to snap onto said bead members, said flange members abutting a lower portion of the bead members of the respective mounting rails when said solar energy system is assembled, and with the maximum distance between said flange members of each unit being slightly greater than the minimum distance between the bead members of parallel mounting rails, said flange members being flexible whereby said flange members of each unit are flexed inwardly away from a preferred position when said unit is initially moved between said parallel mounting rails and moves back to said preferred position once said flange members pass by the respective bead members on the parallel mounting rails with the flange members abutting said lower portion of the bead members.

4. A solar energy collecting system adapted to be mounted on a supporting surface comprising:
a plurality of individual solar collector units, each of said units having a base sheet member having flange members extending along opposite sides thereof, wherein each of said base sheet members has a substantially planar main portion from which said flange members extend upwardly at an angle, and
mounting rails extending in parallel relationship along said supporting surface between adjacent units, each of said mounting rails includes a bead member having a symmetrical cross-sectional width greater than the portion of the rail immediately below said bead, said bead member extending along an upper edge of said rail, said upwardly and angularly extending flange members abutting a lower portion of the bead members against said rail of the respective mounting rails when said solar energy system is assembled and wherein the maximum distance between said flange members of each unit is slightly greater than the minimum distance between the bead members of parallel mounting rails, said flange members being flexible whereby said flange members of each unit are flexed inwardly away from a preferred position when said unit is initially moved between said parallel mounting rails and moves back to said preferred position once said flange members pass by the respective bead members on the parallel mounting rails with the flange members abutting said lower portion of the bead members.

5. A solar energy collecting system adapted to be mounted on a supporting surface comprising:
a plurality of individual solar collector units, each of said units having a base sheet member having flange members extending along opposite sides thereof, wherein each of said base sheet members has a substantially planar main portion from which said flange members extend upwardly at an angle,
mounting rails extending in parallel relationship along said supporting surface between adjacent units,
clip means for maintaining said units against said mounting rails, said clip means extending over at least a portion of said mounting rails and a portion of said flange units to integrate the units into a solar energy collecting system,
each of said mounting rails includes a bead member extending along an upper edge thereof and wherein said clip means are resilient and adapted to snap onto said bead members, said flange members abutting a lower portion of the bead members of the respective mounting rails when said solar energy system is assembled,
wherein said base sheet members extend beyond the respective units in a direction parallel to said mounting rails are assembled with said respective base sheet members overlapping, and
means for attaching said one base sheet member to said support surface whereby each unit supports its own weight while still permitting relative sliding movement between said adjacent units in the direction parallel to said mounting rails.

6. A solar energy collecting system adapted to be mounted on a supporting surface, said mounted system providing a water-tight cover over said supporting surface, said system comprising:
a plurality of mounting rails vertically extending in parallel relationship affixed to said supporting surface,
a plurality of solar collector units for collecting heat from the sun, each of said units having a waterproof base sheet member extending under said unit and upwardly along opposite longitudinal sides thereof, said rails being spaced to substantially correspond to the distance between said opposing upward extensions, said base sheet member further extending outwardly from opposing bottom and top ends thereof,
a first means at the bottom end of each unit for connecting in fluid communication to said unit,
a second means at the top end of each unit for connecting in fluid communication to said unit,
said units being stacked between each pair of said rails by slideably engaging said first connecting means of the upper unit in said stacked relationship to said second connecting means of the next lower unit in said stacked relationship, the bottom outward extension of said upper unit being oriented over the top outward extension of said lower unit, the edge of said bottom outward extension being oriented in close proximity to said lower unit, said overlapping of said bottom and top extensions being capable of preventing water from reaching said supporting surface, said first connecting means being capable of sliding outwardly from and inwardly to said second connecting means in response to thermal expansion and contraction while maintaining a fluid seal between said upper and lower units,
means for mounting the outward extension of said lower unit to said supporting surface, said bottom outward extension of said upper unit being capable of sliding upwardly and downwardly over said top outward extension in response to thermal expansion and contraction while maintaining said water prevention,
means for affixing adjacent rows of said stacked units to the rail between said adjacent rows, said affixing means cooperating with the upward base member extensions of said adjacent units to firmly attach said upward extensions to said rail, and
means placed over each affixation of said adjacent upward extensions and said rail for providing a water tight seal therefor.

7. A solar energy collecting system adapted to be mounted on a supporting surface comprising:
a plurality of individual solar collector units, each of said units having a base sheet member having flange members extending along opposite sides thereof, wherein each of said base sheet members has a substantially planar main portion from which said flange members extend upwardly at an angle,
mounting rails extending in parallel relationship along said supporting surface between adjacent units, each of said mounting rails having a bead member extending along an upper edge thereof, said bead member being substantially circular in cross-section, and
clip means for maintaining said flanges against said mounting rails, said clip means in cross-section includes a head portion substantially conforming in configuration to the cross-section of said bead member, said clip means further including a pair of symmetric leg portions extending away from opposite sides of said head portion, each of said leg portions being adapted to overlie the flange members of the solar collector units positioned adjacent to the respective mounting rail, said clip means being sufficiently resilient to snap onto said bead members to firmly position each of said leg portions in parallel engagement over the end of a flange.

8. The solar energy collecting system of claim 7 wherein said clip means are elongated and extend for a distance of at least as long as the length of the flange members on each solar collector unit.

9. The solar energy collection system of claim 7 wherein the maximum distance between the flange members of each unit is slightly greater than the minimum distance between the bead members of parallel mounting rails, said flange members being flexible whereby said flange members of each unit are flexed inwardly away from a preferred position when said unit is initially moved between said parallel mounting rails and moves back to said preferred position once said flange members pass by the respective bead members on the parallel mounting rails with the flange members abutting said lower portion of the bead members.

10. A solar collector unit comprising:
a base sheet member having a substantially planar main portion
an insulating member positionable on said base sheet member,
a collector panel positionable on said insulating member, said panel having two sheet members mounted to each other, at least one of said sheet member having a
plurality of parallel grooves so that said sheet members form a collector panel with a plurality of parallel channels when said sheet members are mounted to each other,
a cover member, said cover being substantially transparent and dimensioned to fit over said insulating member and said collector panel and against said base sheet member to enclose said insulating member and collector panel therebetween, said cover member having a domed portion and a plurality of walls joined thereto and extending from said domed portion to said base sheet member, said base sheet member extending outwardly of said cover member at the top and bottom ends thereof, said base sheet member further having flanges extending outwardly of said main portion along opposing sides thereof at an angle to said main portion,
a substantially planar member made of substantially transparent material,
means for supporting said planar member within said cover member in a position spaced from said collector panel, said support means having portions positioned adjacent said walls of said cover member, said support means being made of low thermal conducting material which acts as a heat shield for the walls of the cover member, said portions of said support means having a top edge on which a perimeter portion of said planar member rests, said planar member being movable relative to any three-dimensional direction with respect to said support means to accomodate thermal expansion and contraction occurring in said support means, said cover member and said planar member.

11. The solar collector unit of claim 10 wherein said cover member, said planar member, said supporting means, and said sheet members of said collector plate are respectively made of plexiglass, glass, cardboard, and stainless steel.

12. The solar collector unit of claim 10 wherein said walls of said cover member have an inwardly directed shoulder portion where said walls are joined to said domed portion, said supporting means for said planar member extending upwardly from said base sheet member to a location just below said inwardly directed shoulder portion of said walls whereby said planar member is supported on said the edges thereof with the perimeter portion of said planar member positioned between said top edges and an upper part of said shoulder portion.

* * * * *